United States Patent
Vanapalli et al.

(10) Patent No.: US 10,823,191 B2
(45) Date of Patent: Nov. 3, 2020

(54) GAS TURBINE ENGINE ARRANGEMENT WITH ULTRA HIGH PRESSURE COMPRESSOR

(71) Applicant: General Electric Company, Schenectady, NY (US)

(72) Inventors: Veeraraju Vanapalli, Bangalore (IN); Bhaskar Nanda Mondal, Bangalore (IN); Rajendra Mahadeorao Wankhade, Bangalore (IN); Ramana Reddy Kollam, Bangalore (IN)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 15/922,153

(22) Filed: Mar. 15, 2018

(65) Prior Publication Data
US 2019/0285082 A1 Sep. 19, 2019

(51) Int. Cl.
| | |
|---|---|
| *F04D 29/38* | (2006.01) |
| *F04D 29/32* | (2006.01) |
| *F02K 3/06* | (2006.01) |
| *F01D 5/14* | (2006.01) |
| *F02C 3/073* | (2006.01) |
| *F02C 7/06* | (2006.01) |

(52) U.S. Cl.
CPC .......... *F04D 29/324* (2013.01); *F01D 5/147* (2013.01); *F02C 3/073* (2013.01); *F02C 7/06* (2013.01); *F02K 3/06* (2013.01); *F05D 2220/3217* (2013.01); *F05D 2240/30* (2013.01); *F05D 2240/52* (2013.01); *F05D 2240/54* (2013.01); *F05D 2300/17* (2013.01); *F05D 2300/522* (2013.01)

(58) Field of Classification Search
None
See application file for complete search history.

(56) References Cited

U.S. PATENT DOCUMENTS

| | | | | |
|---|---|---|---|---|
| 3,956,887 | A | * 5/1976 | MacDonald | ............. F02C 3/06 60/793 |
| 5,067,876 | A | 11/1991 | Moremann, III | |
| 5,167,489 | A | 12/1992 | Wadia et al. | |
| 5,486,095 | A | 1/1996 | Rhoda et al. | |
| 6,134,880 | A | * 10/2000 | Yoshinaka | ............. F02C 7/143 60/226.1 |
| 6,158,210 | A | 12/2000 | Orlando | |
| 6,375,421 | B1 | 4/2002 | Lammas et al. | |
| 7,475,545 | B2 | 1/2009 | Johnson | |
| 8,511,987 | B2 | * 8/2013 | Reinhardt | ............. F01D 25/162 415/229 |
| 8,579,592 | B2 | 11/2013 | Kodama et al. | |
| 8,821,785 | B2 | 9/2014 | Voice et al. | |
| 8,869,504 | B1 | * 10/2014 | Schwarz | ................... F02C 7/06 60/226.1 |

(Continued)

*Primary Examiner* — Kayla Mccaffrey
(74) *Attorney, Agent, or Firm* — Dority & Manning, P.A.

(57) ABSTRACT

The present disclosure is directed to a gas turbine engine including a first frame comprising a first bearing assembly, a second frame comprising a second bearing assembly, and a compressor rotor. A first stage compressor airfoil is defined at an upstream-most stage of the compressor rotor. The compressor rotor is rotatable via the first bearing assembly and the second bearing assembly. The first stage compressor airfoil is disposed between the first bearing assembly and the second bearing assembly.

20 Claims, 4 Drawing Sheets

(56) References Cited

U.S. PATENT DOCUMENTS

| | | |
|---|---|---|
| 9,303,589 B2 | 4/2016 | Heikurinen et al. |
| 9,709,070 B2 | 7/2017 | Heikurinen et al. |
| 2010/0105516 A1 | 4/2010 | Sheridan et al. |
| 2014/0219805 A1 | 8/2014 | Lamboy et al. |
| 2016/0138408 A1 | 5/2016 | Bordne et al. |

* cited by examiner

GAS TURBINE ENGINE ARRANGEMENT WITH ULTRA HIGH PRESSURE COMPRESSOR

FIELD

The present subject matter is related to gas turbine engines. More specifically, the present subject matter is directed to gas turbine engine compressors.

BACKGROUND

Gas turbine engines generally include fan or propeller assemblies in serial flow arrangement with a compressor section, a combustion section, and a turbine section. The compressor section often includes at least two compressors in serial flow arrangement; a low or intermediate pressure compressor generating a first pressure higher than a compressor inlet pressure aft of the fan assembly, and a high pressure compressor generating a second pressure at the combustion section higher than the first pressure. Each compressor is generally coupled to a turbine via a shaft, together defining a spool. Each spool is disposed on two or more bearing assemblies, such as at least at a forward or upstream end and an aft or downstream end. Each spool is generally rotatable mechanically independently of one another, with generally an aerodynamic dependency driving each spool during engine operation.

Gas turbine engine designers and manufacturers are generally challenged to improve compressor section performance and operability, such as via an increased pressure ratio of the compressor section to provide more energy for combustion at the combustion chamber. Furthermore, they are also challenged to increase pressure ratio while maintaining or reducing a number of axial stages of the compressor section relative to the engine type or apparatus to which the engine is installed. Furthermore, designers and manufacturers are generally challenged to reduce an overall weight of the gas turbine engine, such as via reducing engine part counts, reducing engine dimensions (e.g., via reducing axial stages), or incorporating certain materials throughout the engine. Such weight reduction generally improves engine performance, such as by improving high pressure compressor performance via increased tip speed and pressure ratio.

However, material choices are limited by weight, strength, and temperature capability. For example, titanium-based materials are known to provide a generally desired combination of sufficient strength, low weight, and adequate temperature capability for low- and intermediate-pressure compressors, and forward or upstream portions of high-pressure compressors. Nickel-based materials are known to provide a generally necessary combination of strength and temperature capability greater than titanium-based materials. However, nickel-based materials are generally denser or weigh more relative to titanium-based materials. As such, nickel-based materials are generally used where a combination of strength and temperature are necessary, such as at hotter portions of the engine (e.g., above 530 degrees Celsius). Such hotter portions of the engine generally include the mid- to aft-end portion of the high pressure compressor, the combustion section, and the turbine section.

As such, there is a need for a compressor section such as to provide higher rotational speeds and pressure ratios while maintaining or reducing overall engine weight.

BRIEF DESCRIPTION

Aspects and advantages of the invention will be set forth in part in the following description, or may be obvious from the description, or may be learned through practice of the invention.

The present disclosure is directed to a gas turbine engine including a first frame comprising a first bearing assembly, a second frame comprising a second bearing assembly, and a compressor rotor. A first stage compressor airfoil is defined at an upstream-most stage of the compressor rotor. The compressor rotor is rotatable via the first bearing assembly and the second bearing assembly. The first stage compressor airfoil is disposed between the first bearing assembly and the second bearing assembly.

In various embodiments, a radial plane is defined extended from an axial centerline of the compressor rotor. The second bearing assembly is disposed co-planar to the compressor rotor along the radial plane. In one embodiment, the second bearing assembly is disposed aft of the first stage compressor airfoil of the compressor rotor.

In another embodiment, the first frame defines a first airfoil upstream in fluid communication with the compressor rotor.

In various embodiments, the second frame comprises a structural member extended radially across a core flowpath of the engine. In one embodiment, the second frame further comprises a second airfoil extended radially across the core flowpath. In still various embodiments, the second frame defines a plurality of the structural member. The second frame further defines a second airfoil disposed between the plurality of the structural member. In one embodiment, the second airfoil defines a variable vane at least partially rotatable around a radial axis of the second airfoil.

In various embodiments, the engine further includes a combustor assembly, a first turbine rotor, and a third bearing assembly. The third bearing assembly provides rotatable support to the compressor rotor and the first turbine rotor. The third bearing assembly is downstream of the second bearing assembly. In one embodiment, the third bearing assembly is disposed radially inward of the combustor assembly or the first turbine rotor.

In still various embodiments, the engine further includes a fan assembly in serial flow arrangement upstream of the compressor rotor. The compressor rotor is in direct fluid communication with the fan assembly. A second turbine rotor is coupled to the fan assembly via a second shaft. The second turbine rotor and the fan assembly are together rotatable via the second shaft. The gas turbine engine defines the fan assembly, the compressor rotor, the combustor assembly, the first turbine rotor, and the second turbine rotor in direct serial flow arrangement. In one embodiment, the engine further includes an outer casing generally surrounding the first turbine rotor and the compressor rotor. The outer casing defines a core flow inlet into a core flowpath. The first stage compressor airfoil of the compressor rotor is in direct fluid communication with the core flow inlet.

In various embodiments, the first stage compressor airfoil defines a first stage pressure ratio of at least approximately 1.7 during operation of the gas turbine engine at a tip speed of at least approximately 472 meters per second. In one embodiment, the first stage compressor airfoil defines a maximum first stage pressure ratio of approximately 1.9. In another embodiment, the first stage compressor airfoil defines a radius ratio of an inner radius of the first stage compressor airfoil within a core flowpath versus an outer radius of the first stage compressor airfoil within the core flowpath, and wherein the radius ratio is less than approximately 0.4. In another embodiment, the first stage compressor airfoil defines the radius ratio between approximately 0.2 and approximately 0.4.

In one embodiment, the compressor rotor defines a maximum tip speed of approximately 564 meters per second or less.

In various embodiments, the first stage compressor airfoil comprises a first material defining a tensile strength to density ratio of approximately 0.18 or greater. In one embodiment, the first material of the first stage compressor airfoil further defines a tensile strength equal to or greater than approximately 1000 Mpa.

In one embodiment, the compressor rotor defines a compressor pressure ratio between approximately 20:1 and approximately 39:1.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
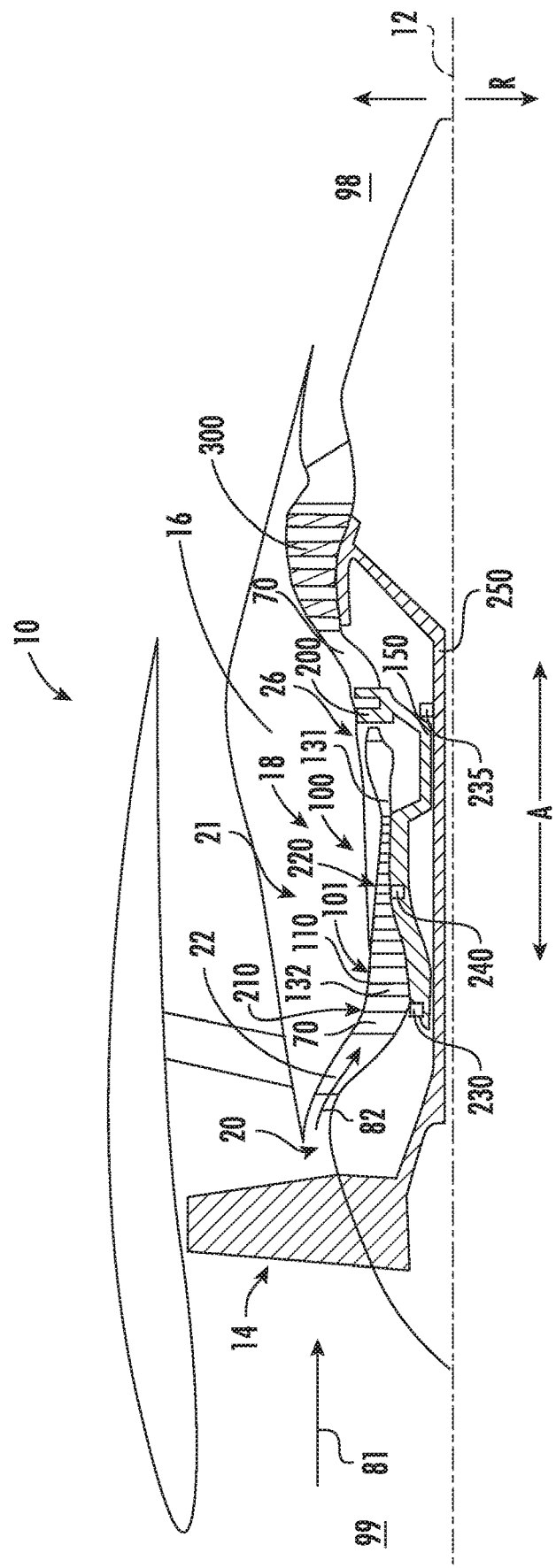
FIG. 1 is a cross sectional view of an exemplary gas turbine engine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of an engine including a compressor section such as to provide higher rotational speeds and pressure ratios while maintaining or reducing overall engine weight are generally provided. The embodiments of the engine provided herein include a compressor rotor assembly coupled to a turbine rotor assembly defining pressure ratios and airfoil tip speeds that may obviate the need for a low- or intermediate-pressure compressor upstream of the compressor rotor assembly (e.g., a booster-less compressor section). As such, the embodiments of the engine including the compressor section herein may improve engine performance by reducing engine weight and reducing part quantities by removing a low- or intermediate-pressure compressor from the engine while providing relatively high tip speeds and pressure ratios of the compressor section.

The embodiments of the engine herein may further reduce weight and improve performance via removing associated bearing assemblies, controls, valves, manifolds, frames, etc. associated a low- or intermediate-pressure compressor. Still further, the embodiments of the engine provided herein may expand an operational envelop of gas turbine engines such as to enable integration into other apparatuses, such as, but not limited to, dual-cycle engines, three-stream turbofans, and axial-compressor turboprop and turboshaft engines in lieu of centrifugal compressors.

Referring now to the figures, FIG. 1 is an exemplary embodiment of a gas turbine engine 10 (hereinafter, "engine 10") according to an aspect of the present disclosure. The engine 10 defines an axial direction A and a reference axial centerline axis 12 extended through the engine 10 along the axial direction A. A radial direction R is extended from the axial centerline 12. The engine 10 further defines a reference upstream end 99 and a reference downstream end 98.

The engine 10 includes a compressor section 21 including a compressor rotor 100 coupled to a first turbine rotor 200 via a first shaft 150 extended along the axial direction A. The compressor rotor 100 and the first turbine rotor 200, coupled via the first shaft 150, together with a combustor assembly 26 define a core engine 18. The combustor assembly 26 is disposed between the compressor rotor 100 and the first turbine rotor 200 in direct serial flow arrangement.

Figure 2:
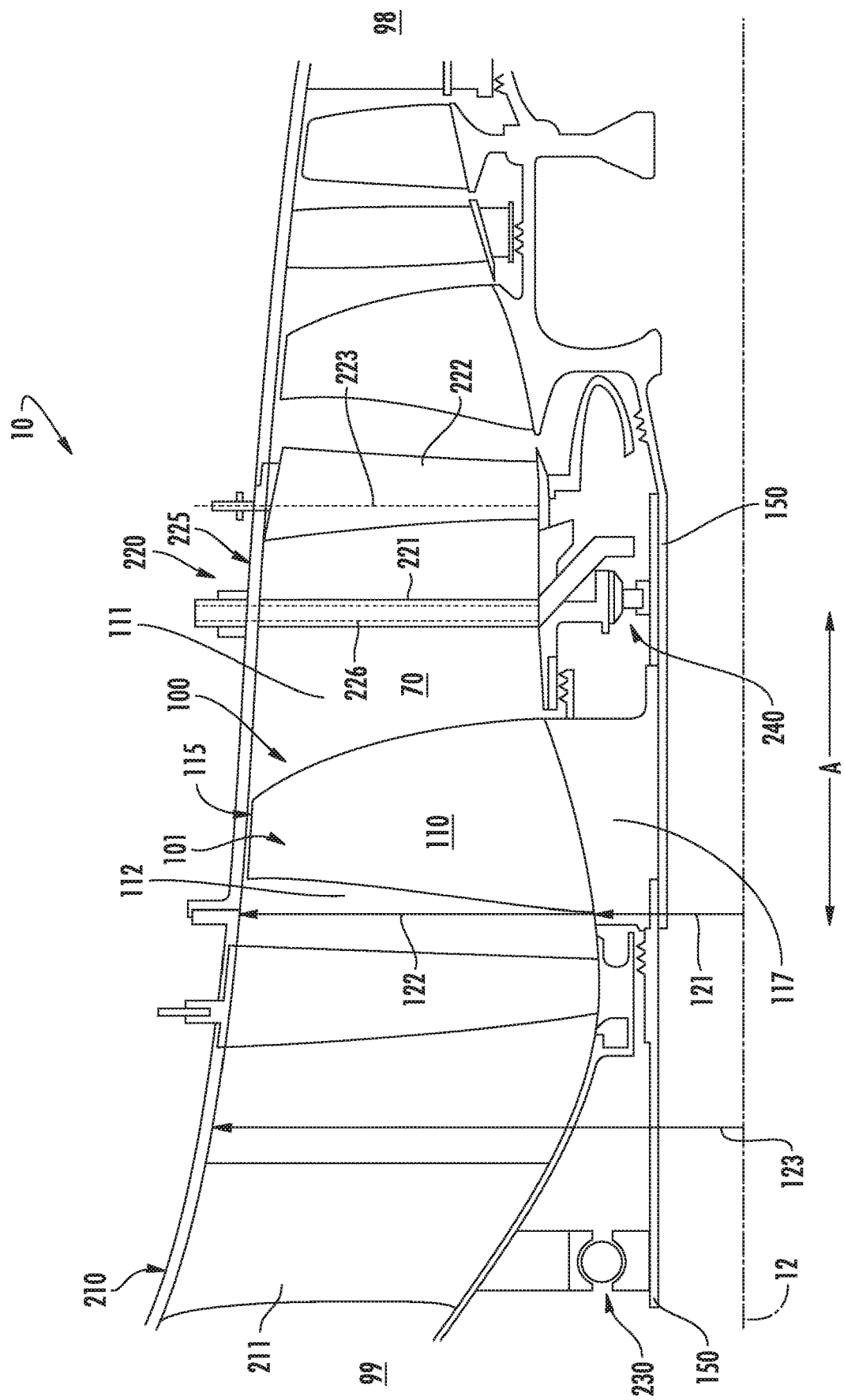
FIGS. 2-3 are cross sectional views of embodiments of a portion of a compressor rotor of the gas turbine engine according to an aspect of the present disclosure.

Referring now to FIG. 2, a cross sectional view of a portion of the engine 10 is generally provided. The compressor rotor 100 includes a first stage compressor airfoil 110 defined at an upstream-most rotating first stage 101 of the compressor rotor 100. The first stage compressor airfoil 110 defines an airfoil tip 115 at a radially outward end of the airfoil 110. The compressor rotor 100 generally includes a first material defining a tensile strength to density ratio of approximately 0.18 or greater. In one embodiment, the first material defines a tensile strength to density ratio of approximately 0.20 or greater. In various embodiments, the first material further defines a tensile strength equal to or greater than approximately 1000 mega pascals (Mpa). In another embodiment, the first material may further define a tensile strength of approximately 2000 Mpa or less. In still various embodiments, the first material may further define a tensile strength of approximately 1550 Mpa or less. In still yet various embodiments, the first material may further define a density of approximately 7750 kilograms per cubic meter or less. In yet another embodiment, the first material may further define a density greater than approximately 500 kilograms per cubic meter.

Examples of the first material include nickel-based materials, such as, but not limited to, nickel-based materials including Inconel family of nickel-chromium alloys. Various embodiments of the compressor rotor 100 may further include forgings of the first material, such as nickel-based forgings, to define the first stage compressor airfoil 110, and a first stage rotor 117 to which the first stage compressor airfoil 110 is attached, as a bladed-disk (Blisk) or integrally bladed rotor (IBR). Still various embodiments of the compressor rotor 100 may generally define the first stage compressor airfoil 110, the first stage rotor 117, or both, as the first material.

The strength properties of the first stage compressor airfoil 110 enable the compressor rotor 100 to define a radius ratio of an inner radius 121 of the first stage compressor airfoil 110 within the core flowpath 70 versus an outer radius 122 of the first stage compressor airfoil 110 within the core flowpath 70. The radius ratio of inner radius 121 to outer radius 122 at the first stage compressor airfoil 110 is less than approximately 0.4.

In one embodiment, the compressor rotor 100, such as at the first stage compressor airfoil 110, defines the radius ratio between approximately 0.2 and approximately 0.4. For example, in one embodiment, the first stage compressor airfoil 110 defines a substantially hollow airfoil. In various embodiments, the compressor rotor 100 may be formed via one or more additive manufacturing processes.

In another embodiment, the compressor rotor 100, such as at the first stage compressor airfoil 110, defines the radius ratio between approximately 0.33 and approximately 0.4. For example, in one embodiment, the first stage compressor airfoil 110 defines a substantially solid airfoil. In various embodiments, the compressor rotor 100 may be formed via one or more additive manufacturing processes, forging, machining, or combinations thereof.

Referring still to FIG. 2, the compressor rotor 100 may define twelve or fewer axially separated rotating stages of airfoils. In various embodiments, the compressor rotor 100 defines a maximum compressor pressure ratio from downstream of the compressor rotor 100 to upstream of the compressor rotor 100 between approximately 20:1 and approximately 39:1. In still various embodiments, the compressor rotor 100 defines at least eight axially separated rotating stages of airfoils.

The first stage compressor airfoil 110 defines a first stage pressure ratio from immediately downstream of the first stage compressor airfoil 110 (shown schematically at point 111) to immediately upstream of the first stage compressor airfoil 110 (shown schematically at point 112). The first stage pressure ratio (pressure at approximately point 112 versus pressure at approximately point 111) is at least approximately 1.7 during operation of the engine 10 at an airfoil tip speed of at least approximately 472 meters per second.

In various embodiments, the first stage compressor airfoil 110 defines a maximum first stage pressure ratio of approximately 1.9. Still further, the first stage compressor airfoil 110 defines a first stage pressure ratio between approximately 1.7 and approximately 1.9 (e.g., a pressure ratio across the first stage 101 of the compressor rotor 100) an airfoil tip speed between approximately 472 meters per second and approximately 564 meters per second (e.g., a rotational speed of the airfoil tip 115).

Referring back to FIGS. 1-2, the engine 10 further includes an outer casing 16 generally surrounding the first turbine rotor 200 and the compressor rotor 100. The outer casing 16 defines a core flow inlet 20 into the core flowpath 70. The first stage compressor airfoil 110 of the compressor rotor 100 is in direct fluid communication with the core flow inlet 20. For example, the engine 10 may include a structural strut 22 at least partially defining a static airfoil conditioning a flow of fluid through the core flow inlet 20 into the core flowpath 70. The first stage compressor airfoil 110, defining the upstream-most rotating stage 101 of the compressor rotor 100 of the compressor section 21, is disposed downstream of the structural strut 22.

In various embodiments, the engine 10 further includes a fan assembly 14 in serial flow arrangement upstream of the compressor rotor 100. The compressor rotor 100 is in direct fluid communication with the fan assembly 14.

The engine 10 may further include a second turbine rotor 300 coupled to the fan assembly 14 via a second shaft 250. The second turbine rotor 300 and the fan assembly 14 are together rotatable via the second shaft 250. The engine 10 defines the fan assembly 14, the core engine 18, and the second turbine rotor 300 in serial flow arrangement.

In various embodiments, the second turbine rotor 300 may generally define a low pressure turbine coupled to the fan assembly 14. In still various embodiments, the first turbine rotor 200 may define a high pressure turbine coupled to the compressor rotor 100.

During operation of the engine 10 shown collectively in FIGS. 1-2, a flow of air, shown schematically by arrows 81, flows across the fan assembly 14. A portion of the flow of air 81, shown schematically by arrows 82, enters the core engine 18 through the core flow inlet 20 into the core flowpath 70. The flow of air 82 is compressed by successive stages of the compressor rotor 100 disposed directly downstream of the fan assembly 14. The first stage 101 of the compressor rotor 100 compresses the flow of air 82 by approximately 1.7 to approximately 1.9 times relative to the downstream side 111 versus the upstream side 112 of the first stage compressor airfoil 110. The following successive stages of the compressor rotor 100 progressively compress the flow of air 82 to a maximum pressure ratio between approximately 20:1 to approximately 39:1 from the downstream end versus the upstream end of the compressor rotor 100.

The compressor rotor 100 defines a relatively high strength material, such as the first material described herein, at the first stage 101 to enable defining the radius ratio of approximately 0.4 or less. The relatively high strength material may further enable the compressor rotor 100 to operate or rotate at a maximum tip speed (i.e., rotational speed at the tip 115 of the compressor rotor 100) of at least approximately 472 meters per second. As such, defining the first stage 101 of the compressor rotor 100 of the high strength properties material such as the first material described herein may provide much higher rotational speeds, performance, and efficiency. The compressor rotor 100 defining the first stage compressor airfoil 110 such as described herein may provide such improvements despite relatively high densities or temperature capacity margin (i.e., temperature capacity of the first material relative to expected maximum temperatures at the first stage 101 of the compressor rotor 100) of the first material (e.g., a nickel-based material) at the first stage 101 of the compressor rotor 100 relative to the generally low pressures and temperatures at the first stage 101 of the compressor section 21.

Still further, embodiments of the engine 10 including embodiments of the compressor rotor 100 may provide improved performance, including reduced fuel consumption, via the decreased weight of the engine 10 including the higher performance core engine 18 including the compressor rotor 100 coupled to the first turbine rotor 200. The engine 10 may include reduced size, such as axial and/or radial dimensions, relative to engines 10 including compressor sections 21 including one or more compressors coupled to the second turbine rotor 300 and/or the fan assembly 14.

Referring still to FIG. 2, the compressor section 21 further includes a first frame 210 forward or upstream 99 of the first stage 101 of the compressor rotor 100 (i.e., forward of the first stage compressor airfoil 110) and a second frame 220 aft or downstream 98 of first stage 101 of the compressor rotor 100 (i.e., aft of the first stage compressor airfoil 110). For example, the first stage 101 of the compressor rotor 100 (i.e., the first stage compressor airfoil 110) is defined between the first frame 210 and the second frame 220. A guide vane 211 is disposed upstream of the first stage compressor airfoil 110, overlapping in the radial direction with the first bearing assembly 101. The compressor rotor 100 is rotatable via a first bearing assembly 230 coupled to the first frame 210. The compressor rotor 100 is further rotatable via a second bearing assembly 240 coupled to the second frame 220. For example, the first frame 210 including the first bearing assembly 230 is defined upstream of the first stage 101 of the compressor rotor 100.

In various embodiments, the first bearing assembly 230 and/or the second bearing assembly 240 may define a rolling element bearing enabling rotating of the compressor rotor 100 relative to the stationary first frame 210 and second frame 220. The first bearing assembly 230 and the second bearing assembly 240 may define a rolling element bearing defining a roller bearing, a tapered roller bearing, a thrust bearing such as a ball or spherical bearing, or combinations thereof. For example, the first bearing assembly 230 may define a thrust bearing and the second bearing assembly 240 may define a roller bearing. As another example, the first bearing assembly 230 and the second bearing assembly 240 may each define a tapered roller bearing.

In still another embodiment, the first bearing assembly 230, the second bearing assembly 240, or both, may define a fluid film bearing. For example, the fluid film bearing may define a journal or thrust bearing producing a film or fluid (e.g., air, lubricant, etc.) between the compressor rotor 100 and the stationary first frame 210 and/or second frame 220. The fluid film bearing may generally define a non-contact bearing, such that the fluid of the fluid film bearing generally disables contact between the compressor rotor 100 and one or more of the frames 210, 220.

In various embodiments, the first bearing assembly 230, the second bearing assembly 240, or combinations thereof, may define combinations of a rolling element bearing and a fluid film bearing. Although certain configurations or types foe bearing assembly have been provided, it should be appreciated that one or more other types of bearings known in the art not shown or described herein may be defined at the first bearing 230 assembly and/or the second bearing assembly 240.

Referring still to FIG. 2, the engine 10 defines a radial plane 123 extended from the axial centerline 12 of the engine 10. The second bearing assembly 240 is disposed co-planar to the compressor rotor 100 along the radial plane 123. For example, the second bearing assembly 240 is disposed within the compressor section 21. As another example, the second bearing assembly 240 is disposed radially inward of the compressor rotor 100.

Figure 3:
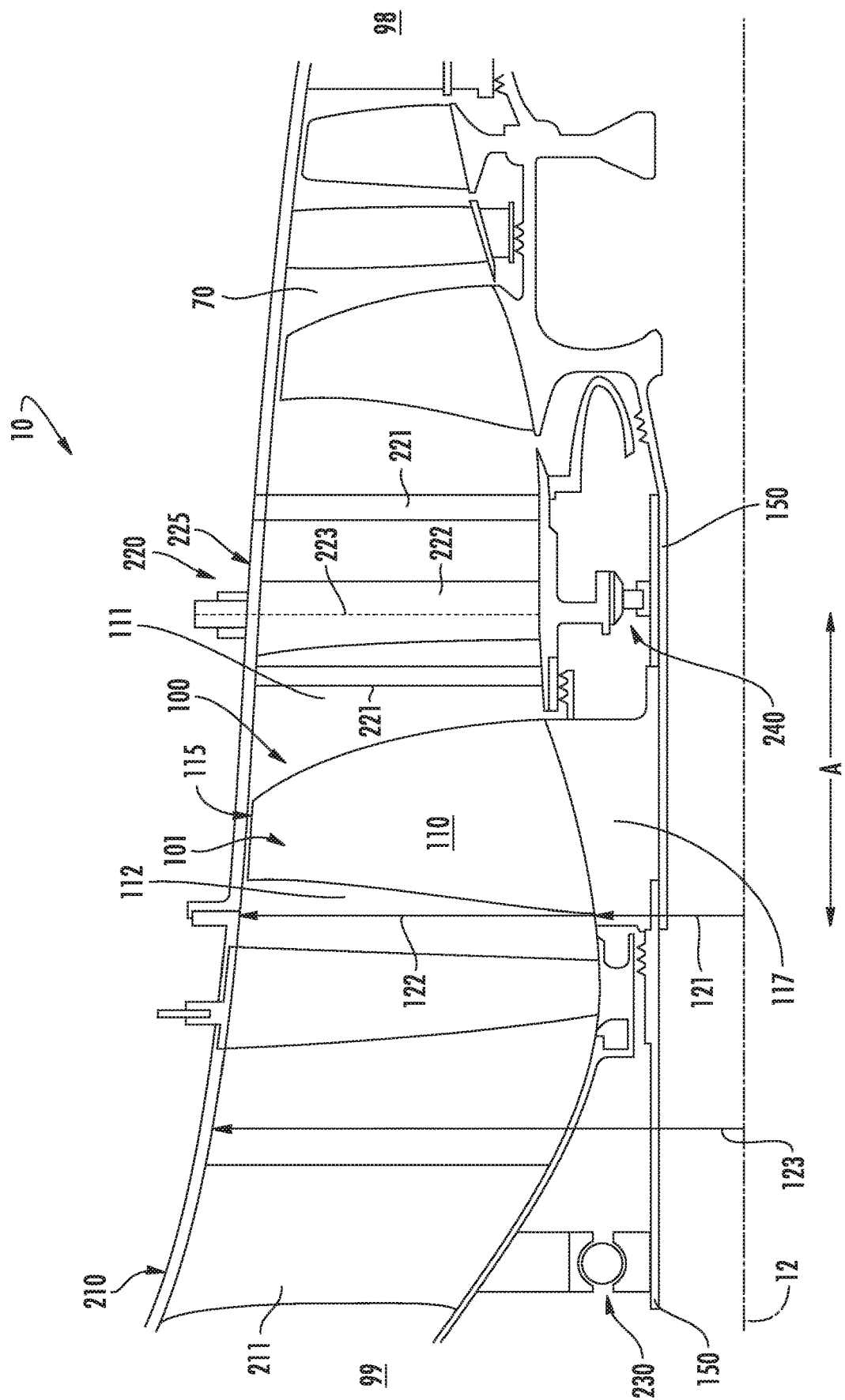

Referring still to FIG. 2, in conjunction with another exemplary embodiment of the engine 10 generally provided in FIG. 3, the second frame 220 further includes a structural member 221 extended radially across the core flowpath 70. In one embodiment, the structural member 221 defines a spoke, rod, or other structural support member coupled to an outer diameter 225 of the second frame 220. The structural member 221 may further be coupled to the second bearing assembly 240 radially inward within the second frame 220.

In various embodiments, the structural member 221 further defines or includes a manifold 226 disposed within the structural member 221. For example, the manifold 226 may define a generally hollow structure through which a flow of fluid is supplied or scavenged to/from the second bearing assembly 240. The flow of fluid (e.g., lubricant, air) may enable operation of the second bearing assembly 240. For example, the flow of fluid may provide vibratory damping, heat transfer, lubricant, or combinations thereof, to the second bearing assembly 240.

Referring still to FIGS. 2-3, the second frame 220 may further include a second airfoil 222 extended radially across the core flowpath 70. The second airfoil 222 generally conditions or adjusts a flow or pressure of air 82 (FIG. 1) as it flows across through the core flowpath 70 through the compressor section 21. In one embodiment, the second airfoil 222 defines a variable vane at least partially rotatable around a radial axis 223 of the second airfoil 222. The second airfoil 222 may rotate about the radial axis 223 such as to adjust the pressure or flow of air downstream of the first stage 101 of the compressor rotor 100, or generally upstream of successive downstream stages of the compressor rotor 100.

Figure 4:
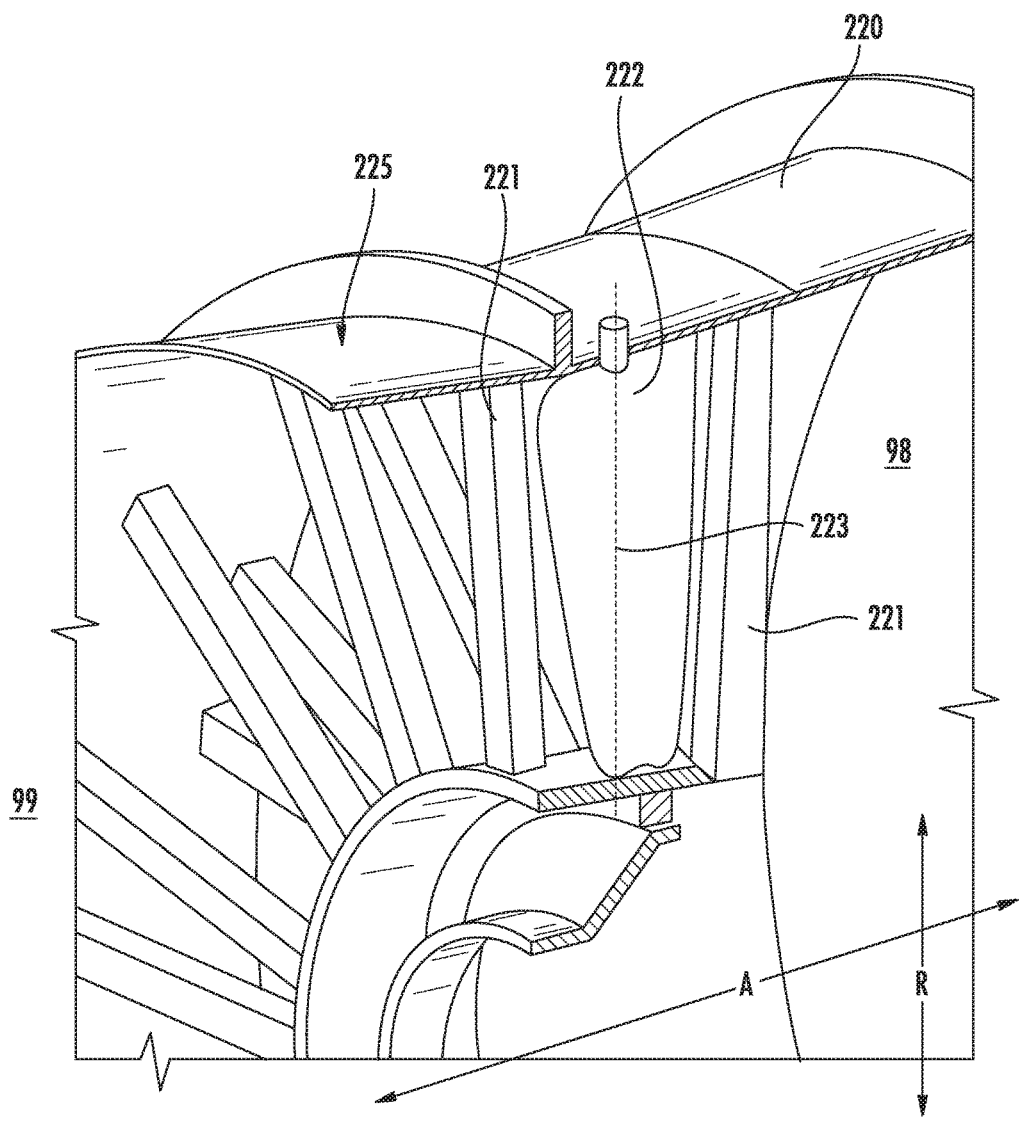
FIG. 4 is a perspective view of an embodiment of a portion of the compressor rotor according to an aspect of the present disclosure.

Referring now to FIG. 3, and in conjunction with an exemplary perspective view of the embodiment of the engine 10 generally provided in regard to FIG. 4, in one embodiment, the second frame 220 defines a plurality of the structural member 221. For example, the second frame 220 may dispose the second airfoil 222 between the plurality of the structural member 221. As another example, the structural member 221 may be defined upstream and downstream of the second airfoil 222. Still further, as generally shown in regard to FIG. 4, the plurality of structural member 221 may be disposed in circumferential arrangement through the core flowpath 70.

Referring back to FIG. 1, the engine 10 may further include a third bearing assembly 235 providing rotatable support to the compressor rotor 100 and the first turbine rotor 200. The third bearing assembly 235 is downstream of the second bearing assembly 240. For example, in one embodiment, the third bearing assembly 235 is disposed radially inward of the combustor assembly 26. In another embodiment, the third bearing assembly 235 is defined radially inward of the first turbine rotor 200. As yet another example, the third bearing assembly 235 is disposed along the radial plane 123 co-planar to the combustor assembly 26 and the first turbine rotor 200.

In still various embodiments, the third bearing assembly 235 may define one or more types or combinations of bearing assembly such as described in regard to the first and second bearing assemblies 230, 240. For example, the third bearing assembly 235 may define a rolling element bearing, a fluid film bearing, or combinations thereof. As yet another example, the third bearing assembly 235 may generally define a number 4 bearing assembly of a gas turbine engine.

In various embodiments, each of the first bearing assembly 230, the second bearing assembly 240, and the third bearing assembly 235 are coupled to a spool including the compressor rotor 100, the first turbine rotor 200, and the first shaft 150. In one embodiment, the second bearing assembly 240 is disposed axially between the first bearing assembly 230 and the third bearing assembly 235. In still various embodiments, the second bearing assembly 240 may be disposed generally between the first stage 101 of the compressor rotor 100 and a downstream end of the compressor rotor 100. For example, in an embodiment in which the compressor rotor 100 defines twelve or fewer stages, the second bearing assembly 240 may be defined between the first stage 101 and the twelfth or last rotating stage of the compressor rotor 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
   a first frame comprising a first bearing assembly;
   a compressor rotor comprising a first stage compressor airfoil defined at an upstream-most stage of the compressor rotor; and
   a second frame comprising a second bearing assembly,
   wherein the compressor rotor is rotatable via the first bearing assembly and the second bearing assembly,
   wherein the first stage compressor airfoil is disposed between the first bearing assembly and the second bearing assembly,
   wherein an entirety of the first stage compressor airfoil is disposed within a core flowpath of the engine, and
   wherein the first stage compressor airfoil overlaps at least partially with a bearing of the first bearing assembly in an axial direction of the gas turbine engine.

2. The engine of claim 1, wherein a radial plane is defined extended from an axial centerline of the compressor rotor, and wherein the second bearing assembly is disposed coplanar to the compressor rotor along the radial plane.

3. The engine of claim 2, wherein the second bearing assembly is disposed aft of the first stage compressor airfoil of the compressor rotor.

4. The engine of claim 1, wherein the first frame defines a first airfoil upstream in fluid communication with the compressor rotor.

5. The engine of claim 1, wherein the second frame comprises a structural member extended radially across a core flowpath of the engine.

6. The engine of claim 5, wherein the second frame further comprises a second airfoil extended radially across the core flowpath.

7. The engine of claim 6, wherein the second airfoil defines a variable vane at least partially rotatable around a radial axis of the second airfoil.

8. The engine of claim 1,
   wherein the second frame comprises a plurality of structural members extended radially across a core flowpath of the engine, and
   wherein the second frame further defines a second airfoil disposed between the plurality of structural members.

9. The engine of claim 1, further comprising:
   a combustor assembly;
   a first turbine rotor; and
   a third bearing assembly, wherein the third bearing assembly provides rotatable support to the compressor rotor and the first turbine rotor, and further wherein the third bearing assembly is downstream of the second bearing assembly.

10. The engine of claim 9, wherein the third bearing assembly is disposed radially inward of the combustor assembly or the first turbine rotor.

11. The engine of claim 9, further comprising:
    a fan assembly in serial flow arrangement upstream of the compressor rotor, wherein the compressor rotor is in direct fluid communication with the fan assembly; and
    a second turbine rotor coupled to the fan assembly via a second turbine shaft, wherein the second turbine rotor and the fan assembly are together rotatable via the second shaft, and further wherein the gas turbine engine defines the fan assembly, the compressor rotor, the combustor assembly, the first turbine rotor, and the second turbine rotor in direct serial flow arrangement.

12. The engine of claim 11, further comprising:
    an outer casing generally surrounding the first turbine rotor and the compressor rotor, wherein the outer casing defines a core flow inlet into a core flowpath, and further wherein the first stage compressor airfoil of the compressor rotor is in direct fluid communication with the core flow inlet.

13. The engine of claim 1, wherein the first stage compressor airfoil defines a first stage pressure ratio of at least approximately 1.7 during operation of the gas turbine engine at a tip speed of at least approximately 472 meters per second.

14. The engine of claim 13, wherein the first stage compressor airfoil defines a maximum first stage pressure ratio of approximately 1.9.

15. The engine of claim 13, wherein the first stage compressor airfoil defines a radius ratio of an inner radius of the first stage compressor airfoil within a core flowpath versus an outer radius of the first stage compressor airfoil within the core flowpath, and wherein the radius ratio is less than approximately 0.4.

16. The engine of claim 15, wherein the first stage compressor airfoil defines the radius ratio between approximately 0.2 and approximately 0.4.

17. The engine of claim 1, wherein the compressor rotor defines a maximum tip speed of approximately 564 meters per second or less.

18. The engine of claim 1, wherein the first stage compressor airfoil comprises a first material defining a tensile strength to density ratio of approximately 0.18 or greater.

19. The engine of claim 18, wherein the first material of the first stage compressor airfoil further defines a tensile strength equal to or greater than approximately 1000 Mpa.

20. The engine of claim 1, wherein the compressor rotor defines a compressor pressure ratio between approximately 20:1 and approximately 39:1.

* * * * *